United States Patent
Visser (10) Patent No.: US 10,275,930 B2
(45) Date of Patent: Apr. 30, 2019

(54) COMBINED INTENSITY PROJECTION

(75) Inventor: Cornelis Pieter Visser, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2542 days.

(21) Appl. No.: 12/447,517

(22) PCT Filed: Oct. 26, 2007

(86) PCT No.: PCT/IB2007/054365
§ 371 (c)(1),
(2), (4) Date: Apr. 28, 2009

(87) PCT Pub. No.: WO2008/053420
PCT Pub. Date: May 8, 2008

(65) Prior Publication Data
US 2010/0053159 A1    Mar. 4, 2010

(30) Foreign Application Priority Data
Oct. 31, 2006 (EP) .................................. 06123213

(51) Int. Cl.
*G06T 19/00* (2011.01)
*G06T 17/20* (2006.01)
(Continued)

(52) U.S. Cl.
CPC .............. *G06T 15/08* (2013.01); *G06T 3/005* (2013.01); *G06T 17/20* (2013.01); *G06T 19/00* (2013.01)

(58) Field of Classification Search
CPC .......... G06T 19/00; G06T 17/20; G06T 3/005
(Continued)

(56) References Cited

U.S. PATENT DOCUMENTS 5,970,167 A    10/1999    Colvin
6,519,354 B1    2/2003    Oshio
(Continued)

FOREIGN PATENT DOCUMENTS

JP    H09259257 A    10/1997
JP    2002236910 A    8/2002
(Continued)

OTHER PUBLICATIONS

Neuman et al., Volume Intensity Projection—FadeMIP, Jul. 29, 2005, Philips CT Presentation, pp. 1-24.*
(Continued)

*Primary Examiner* — Matthew Salvucci (57) ABSTRACT

The invention relates to a system (100) for rendering an image based on a volumetric image data set, the system comprising: a computation unit (110) for computing an initial pixel intensity of a pixel of the image, defined by a corresponding voxel intensity of a corresponding voxel comprised in the volumetric image data set; and an adjustment unit (120) for computing a final pixel intensity of the pixel, based on the initial pixel intensity and on a location of the corresponding voxel. Thus, the system of the invention enables new visualizations of volumetric image data sets. Advantageously, unlike a system using the VIP technique, which requires adjusting intensities of voxels comprised in the image data set, the system of the current invention is arranged to adjust intensities of pixels. This reduces the computational complexity of the rendering technique employed by the system relative to the computational complexity of the VIP technique.

8 Claims, 6 Drawing Sheets

(51) Int. Cl.
*G06T 3/00* (2006.01)
*G06T 15/08* (2011.01)

(58) Field of Classification Search
USPC .................................................. 345/419–439
See application file for complete search history.

(56) References Cited

U.S. PATENT DOCUMENTS

| 7,250,949 | B2 | 7/2007 | Claus et al. |
| 8,126,222 | B2 | 2/2012 | Kohle |
| 8,180,148 | B2 | 5/2012 | Cover et al. |
| 2003/0156747 | A1 | 8/2003 | Faber |
| 2005/0134582 | A1 | 6/2005 | Claus et al. |

FOREIGN PATENT DOCUMENTS

| JP | 2003091735 A | 8/2003 |
| JP | 2005046207 A | 2/2005 |

OTHER PUBLICATIONS

Chan et al., Efficient 3D-3D Vascular Registration Based on Multiple Orthogonal 2D Projections, Jun. 24, 2003, Biomedical image registration: second international workshop, pp. 301-310.*

Shareef et al., A view-dependent approach to MIP for very large data, In Proceedings of SPIE Electronic Imaging (EI), Proceedings SPIE EI '02, vol. 4665, Jan. 2002, pp. 13-21.*

Grevera et al: "GMIP—Generalized Maximum Intensity Projection"; Medical Imaging 2004: Visualization, Image-Guided Procedures, and Display; Proceedings of SPIE, vol. 5367, pp. 636-645.

Vidholm et al: "Haptic Guided Seeding of MRA Images for Semi-Automatic Segmentation"; 2004 2nd IEEE International Symposium on Biomedical Imaging:Macro to Nano; 2004, vol. 1, pp. 288-291.

Hauser et al: "Two-Level Volume Rendering"; IEEE Transactions on Visualization and Computer Graphics, Jul./Sep. 2001, vol. 7, No. 3, pp. 242-252.

Viola et al:"Importance-Driven Feature Enhancement in Volume Visualization"; IEEE Transactions on Visualization and Computer Graphics, vol. 11, No. 4, Jul./Aug. 2005, pp. 408-418.

* cited by examiner

COMBINED INTENSITY PROJECTION

FIELD OF THE INVENTION

The invention relates to the field of medical image data visualization and more specifically to visualization of volumetric medical image data.

BACKGROUND OF THE INVENTION

From a user point of view, volume visualization allows the user to quickly inspect the volumetric image data set and to select a region of interest to the user, such as a radiologist. The algorithms like maximum intensity projection (MIP), closest vessel projection (CVP) and average intensity projection (AIP) are based on ray casting. For each pixel of the displayed image a ray is cast from said pixel through the image data volume, typically a slab. The intensity of a pixel is computed based on the intensities of voxels along the cast ray. For MIP, the intensity of the pixel is the intensity of a voxel along the cast ray having the highest intensity. For CVP, the intensity of the pixel is the intensity of a first voxel along the cast ray having a maximum intensity, possibly a local maximum intensity, greater than a CVP threshold. For AIP, the intensity of the pixel is the average of intensities of voxels along the cast ray. However, the information comprised in these images does not take into account the location of pixels along the cast ray.

Recently, a new method called volume intensity projection (VIP) was introduced by Philips Medical Systems. The idea of VIP is that intensities of voxels along a ray cast from a pixel are multiplied by weight factors. The larger the distance from a voxel to said pixel, the smaller is a weight factor. The voxels with weighed intensities are then used to compute an image, using e.g. MIP.

The current rendering techniques have their advantages and disadvantages. For instance, suppose that a volume comprises a lot of vessels close to each other with slightly different brightness. When applying the VIP technique to this case, vessels that are further away from a viewing plane appear darker than vessels that are closer to the viewing plane, which may give radiologists the false impression that vessels that are further away from a viewing plane have less blood flow than vessels that are closer to the viewing plane. On the other hand, suppose that a volume comprises the aorta on top of the vertebra, both the aorta and the vertebra having similar intensities. Applying the VIP technique to this case advantageously results in the aorta appearing brighter than the vertebra. Other rendering techniques may also be useful for visualizing volumetric image data sets.

SUMMARY OF THE INVENTION

It would be advantageous to have a system for rendering an image based on a volumetric image data set, using a new rendering technique capable of providing further information about the visualized volumetric image data set.

To address this concern, in an aspect of the invention, a system for rendering an image based on a volumetric image data set comprises:

a computation unit for computing an initial pixel intensity of a pixel of the image defined by a corresponding voxel intensity of a corresponding voxel comprised in the volumetric image data set; and an adjustment unit for computing a final pixel intensity of the pixel, based on the initial pixel intensity and on a location of the corresponding voxel.

The computation unit may employ various rendering methods such as, but not limited to, MIP and CVP, to compute the initial pixel intensity. The adjustment unit is capable of adjusting the computed initial pixel intensity on the basis of the location of the corresponding voxel, e.g., in the case of MIP, a voxel having the highest intensity among voxels on a ray cast from said pixel, used by the computation unit to compute the initial intensity. For example, the final pixel intensity may be weakened proportionally to the distance of said corresponding voxel to a viewing plane comprising pixels. Thus, the system of the invention enables new visualizations of volumetric image data sets. An example of a volumetric image data set to which the system may be successfully applied is an image comprising small crossing vessels close to each other with slightly different intensity in the background. Advantageously, unlike a system using the VIP technique, which requires adjusting intensities of voxels comprised in the image data set, the system of the current invention is arranged to adjust intensities of pixels. This reduces the computational complexity of the rendering technique employed by the system relative to the computational complexity of the VIP technique.

In an embodiment of the system, the system further comprises a weight unit for computing a pixel weight of the pixel, based on the location of the corresponding voxel, and the final pixel intensity is a product of the initial pixel intensity and the pixel weight. Defining the final pixel intensity as a product of the initial pixel intensity and the pixel weight is simple to implement and easy to interpret. Typically, pixel weights are defined to enhance visibility of structures in the foreground of the image and to suppress visibility of structures in the background of the image.

In an embodiment of the system, the image is rendered using orthogonal ray casting and the final pixel intensity depends on a distance from the corresponding voxel to a viewing plane. This allows visualizing the voxel depth, which in many rendering techniques, such as MIP and CVP, is not visualized.

In an embodiment of the system, the initial pixel intensity is computed, based on a maximum intensity projection or a closest vessel projection. These computationally inexpensive rendering techniques are fast and most users of the system—medical professionals such as radiologists—are familiar with at least one of these techniques.

In an embodiment of the system, the pixel weight is computed, based on a user input. The weights may be computed based on a weight function. The weight function may be a function of the distance from the corresponding voxel to the viewing plane. The system may comprise means for determining the weight function. For example, the weight function may be defined using B-splines or Bezier curves controlled by a few user-defined control points. This enables the user to manipulate the weights in order to render an optimal image.

In a further aspect of the invention, the system according to the invention is comprised in an image acquisition apparatus.

In a further aspect of the invention, the system according to the invention is comprised in a workstation.

In a further aspect of the invention, a method of rendering an image based on a volumetric image data set comprises:

a computation step for computing an initial pixel intensity of a pixel of the image defined by a corresponding voxel intensity of a corresponding voxel comprised in the volumetric image data set; and an adjustment step for computing a final pixel intensity of the pixel, based on the initial pixel intensity and on a location of the corresponding voxel.

In a further aspect of the invention, a computer program product to be loaded by a computer arrangement comprises instructions for rendering an image based on a volumetric image data set, the computer arrangement comprising a processing unit and a memory, the computer program product, after being loaded, providing said processing unit with the capability to carry out the following tasks:

computing an initial pixel intensity of a pixel of the image defined by a corresponding voxel intensity of a corresponding voxel comprised in the volumetric image data set; and computing a final pixel intensity of the pixel, based on the initial pixel intensity and on a location of the corresponding voxel.

Modifications and variations of the image acquisition apparatus, of the workstation, of the method, and/or of the computer program product, which correspond to modifications and variations of the system, can be carried out by a skilled person on the basis of the present description.

The skilled person will appreciate that the method may be applied to volumetric, i.e. three-dimensional (3D) and four-dimensional (4D), image data acquired by various acquisition modalities such as, but not limited to, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from, and will be elucidated with respect to, the implementations and embodiments described hereinafter and with reference to the accompanying drawings, wherein.

The same reference numerals are used to denote similar parts throughout the Figures.

DETAILED DESCRIPTION OF EMBODIMENTS

Figure 1:
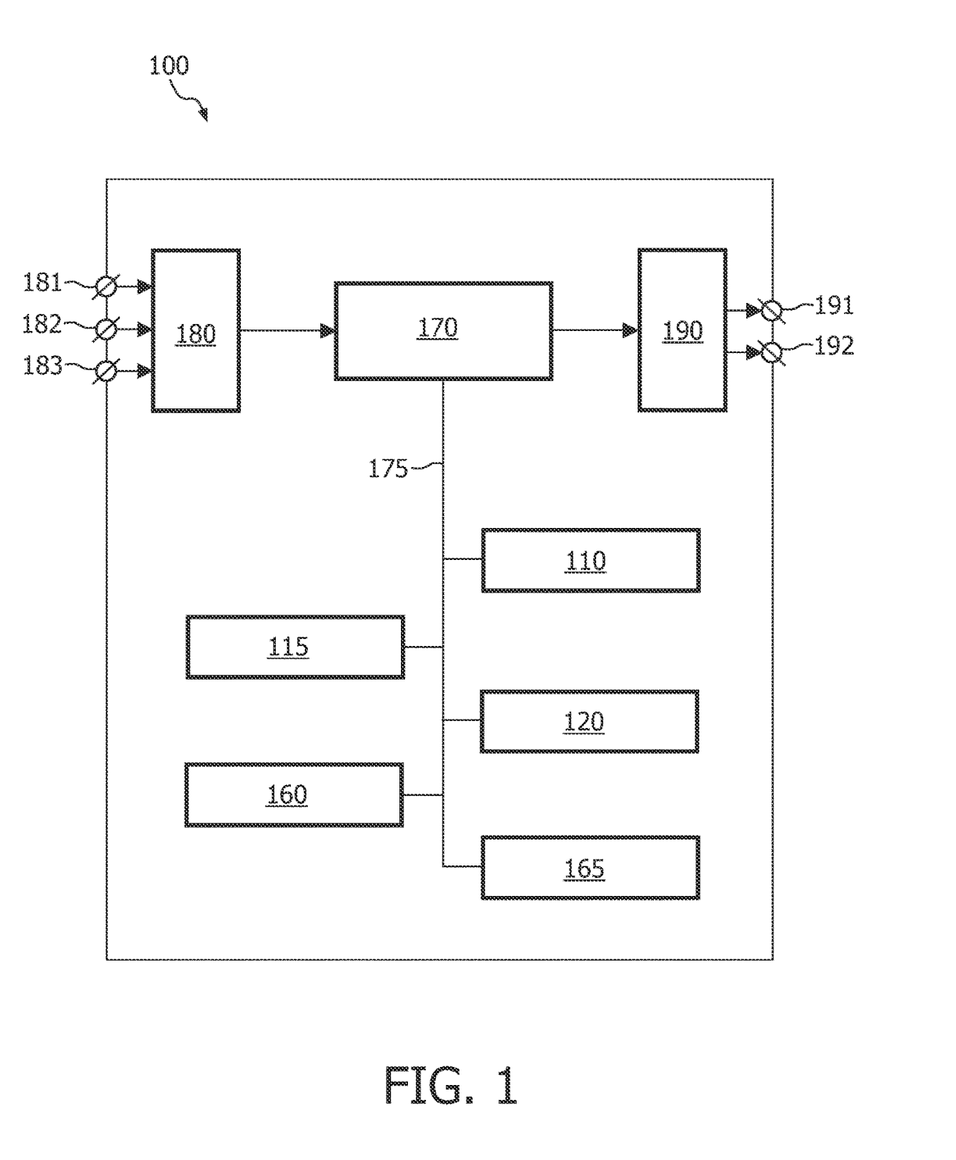
FIG. 1 schematically shows a block diagram of an exemplary embodiment of the system.

FIG. 1 schematically shows a block diagram of an exemplary embodiment of the system 100 for rendering an image based on a volumetric image data set, the system comprising:

a computation unit 110 for computing an initial pixel intensity of a pixel of the image defined by a corresponding voxel intensity of a corresponding voxel comprised in the volumetric image data set; and an adjustment unit 120 for computing a final pixel intensity of the pixel, based on the initial pixel intensity and on a location of the corresponding voxel.

The exemplary embodiment of the system 100 further comprises the following optional units:

a weight unit 115 for computing a pixel weight based on the location of the corresponding voxel, the final pixel intensity being a product of the pixel intensity and the pixel weight;

a control unit 160 for controlling the workflow in the system 100;

a user interface 165 for communicating with a user of the system 100; and a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

The skilled person will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analogue telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data may comprise, for example, the volumetric image data set. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data may comprise, for example, the rendered image data. The memory unit 170 is also arranged to receive data from and deliver data to the units of the system 100 comprising the computation unit 110, the weight unit 115, the adjustment unit 120, the control unit 160, and the user interface 165, via a memory bus 175. The memory unit 170 is further arranged to make the output data available to external devices via any of the output connectors 191 and 192. Storing the data from the units of the system 100 in the memory unit 170 may advantageously improve the performance of the units of the system 100 as well as the rate of transfer of the output data from the units of the system 100 to external devices.

Alternatively, the system 100 may not comprise the memory unit 170 and the memory bus 175. The input data used by the system 100 may be supplied by at least one external device, such as an external memory or a processor, connected to the units of the system 100. Similarly, the output data produced by the system 100 may be supplied to at least one external device, such as an external memory or a processor, connected to the units of the system 100. The units of the system 100 may be arranged to receive the data from each other via internal connections or via a data bus.

In an embodiment of the system 100, the system 100 comprises a control unit 160 for controlling the workflow in the system 100. The control unit may be arranged to receive control data from and provide control data to the units of the system 100. For example, after computing an initial pixel intensity of a pixel, the computation unit 110 may be arranged to send control data "the initial pixel intensity is computed" to the control unit 160 and the control unit 160 may be arranged to provide control data "compute the final pixel intensity" to the adjustment unit 120, requesting the adjustment unit 120 to compute the final pixel intensity. The control unit 160 may be further arranged to terminate computing initial pixel intensities after an initial pixel intensity of the last pixel of the image is computed. Alternatively, a control function may be implemented in another unit of the system 100.

In an embodiment of the system 100, the system 100 comprises a user interface 165 for communicating with the user of the system 100. The user interface 165 may be arranged to provide the user with means for defining how to compute a pixel weight. Optionally, the user interface 165 may receive a user input for selecting a mode of operation of the system 100 such as a mode for selecting a rendering method to be employed by the computation unit 110. The skilled person will understand that more functions may be advantageously implemented in the user interface 165 of the system 100.

A volumetric, i.e. three-dimensional (3D), image data set comprises data elements. Each data element (x, y, z, I) of the medical image data comprises a location (x, y, z), typically represented by three Cartesian coordinates x, y, z in an image data set coordinate system, and an intensity I at this location. The volumetric image data volume may be defined as a volume comprising all locations (x, y, z) comprised in the image data elements (x, y, z, I). A data element may be interpreted as a voxel comprising an intensity I and a small volume, typically a cube or a cuboid, located at a location (x, y, z), which may be a location of a vertex or of the center of the voxel, for example. The image data volume may be interpreted as a union of all voxel cubes or cuboids. The volumetric image data set may be organized as a collection of substantially planar sections or slices of the image volume, e.g. sections or slices substantially perpendicular to a z axis of the image data set coordinate system. A 4D image data set comprises a collection of volumetric image data sets acquired at different time instances.

A 2D image data, also referred to as an image, comprises 2D image data elements. Each 2D image data element (i, j, I) comprises a location (i, j), typically represented by two Cartesian coordinates i, j in a display coordinate system, and at least one intensity I at this location. The skilled person will understand that a 2D image data element may be interpreted as a pixel, i.e. a small area of a display, typically a square or a rectangle, described by a location of the pixel, e.g. by a location (i, j) of a vertex or of the center of the pixel, and an intensity of the pixel, possibly a few color values in the case of color images. There is a one-to-one correspondence between the plane of the display and the viewing plane. Hence, locations in the viewing plane may be also referred to as locations in the display and vice versa. Similarly, pixels in the display may be also referred to as pixels in the viewing plane.

A volume rendering technique is a technique of computing an image based on a volumetric image data set. Computing an image comprises computing intensities of displayed pixels. In rendering techniques suitable for use by the computation unit 110 of the system 100, the intensity of a displayed pixel is derived from the intensity of a corresponding voxel comprised in the volumetric image data set and defined by the rendering technique employed by the computation unit 110.

Examples of such suitable rendering techniques comprise, but are not limited to, MIP, CVP and minimum intensity projection (mIP). These rendering techniques use ray casting. An orthogonal ray is cast from a location on a viewing plane into the image data volume. The location on the viewing plane is an equivalent of a pixel on a display. The intensity of the pixel is computed based on a voxel intensity of a corresponding voxel on the ray. The embodiments of the system 100 will now be described in reference to MIP and CVP rendering techniques. The skilled person will understand, however, that the scope of the claims is not limited to these rendering techniques and other suitable rendering techniques may be also employed by the system 100.

Figure 2:
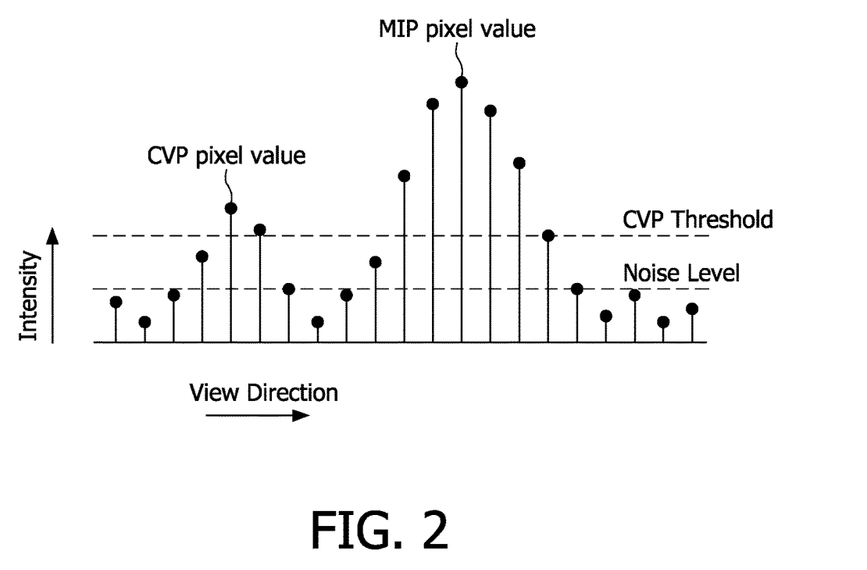
FIG. 2 schematically illustrates computing the initial intensity using MIP and CVP.

The computation unit 110 of the system 100 is arranged for computing an initial pixel intensity of a pixel of the image defined by a corresponding voxel intensity of a corresponding voxel comprised in the volumetric image data set. FIG. 2 schematically illustrates computing the initial intensity, using MIP and CVP. Each dot in FIG. 2 describes a voxel on a ray cast from a pixel in a viewing plane in a viewing direction orthogonal to the viewing plane. The horizontal coordinate of a dot describes the location of a voxel on the ray and the vertical coordinate of a dot describes the voxel intensity of a voxel on the ray. FIG. 2 also schematically shows a Noise Level and a CVP Threshold for computing the initial pixel intensity in the case of CVP.

The intensities of voxels on the ray can be described by a function Voxel_Intensity(Voxel_location). In MIP, the initial pixel intensity is derived from a corresponding voxel labeled "MIP pixel value". The corresponding voxel is defined by the absolute maximum of the function Voxel_Intensity(Voxel_location). In CVP, the initial pixel intensity is derived from a corresponding voxel labeled "CVP pixel value". The corresponding voxel is defined by the first maximum of the function Voxel_Intensity(Voxel_location) larger than the CVP Threshold.

The adjustment unit 120 of the system 100 is arranged for computing a final pixel intensity of a pixel, based on the initial pixel intensity of said pixel computed by the computation unit 110 and on the location of the corresponding voxel used by the computation unit 110 to compute the initial pixel intensity of said pixel. Hence, the adjustment unit 120 can be described by a function Final_Pixel_Intensity(Initial_Pixel_Intensity, Corresponding_Voxel_Location), where Initial_Pixel_Intensity is the initial pixel intensity and Corresponding_Voxel_Location is the location of the corresponding voxel determined by the computation unit 110 to compute the initial pixel intensity of the pixel. The skilled person will appreciate that various functions Final_Pixel_Intensity(Initial_Pixel_Intensity, Corresponding_Voxel_Location) may be useful for visualizing the volumetric image data set. The scope of the claims is not limited to a particular choice of this function.

In an embodiment of the system 100, the system 100 further comprises a weight unit 115 for computing a pixel weight of a pixel, based on the location of the corresponding voxel used by the computation unit 110 to compute the initial pixel intensity of said pixel, and the final pixel intensity is a product of the initial pixel intensity of said pixel and of the pixel weight. Hence, the function Final_Pixel_Intensity(Initial_Pixel_Intensity, Corresponding_Voxel_Location) describing the adjustment unit 110 can be written as a product function Final_Pixel_Intensity(Initial_Pixel_Intensity, Corresponding_Voxel_Location) =Initial_Pixel_Intensity*Weight(Corresponding_Voxel_Location), where Weight(Corresponding_Voxel_Location) is the pixel weight computed by the weight unit 115 based on the Corresponding_Voxel_Location.

In an embodiment of the system 100, the image is rendered using orthogonal ray casting and the final pixel intensity of a pixel depends on a distance from the corresponding voxel, used by the computation unit 110 to compute the initial pixel intensity of said pixel, to a viewing plane. Here, the function Final_Pixel_Intensity(Initial_Pixel_Intensity, Corresponding_Voxel_Location) can be replaced by a simpler function Final_Pixel_Intensity(Initial_Pixel_Intensity, Corresponding_Voxel_Distance), where Corresponding_Voxel_Distance is a distance, e.g. Euclidean distance, from the corresponding voxel to a viewing plane. The image data set coordinate system is typically defined in such a way that the viewing plane is substantially identical to the xy-plane, whereas the cast rays and the viewing direction are substantially parallel to the z-axis. The value of Corresponding_Voxel_Distance is typically stored in the so-called z-buffer of the pixel. If, in addition, the final pixel intensity is a product of the initial pixel intensity and the pixel weight, then Weight(Corresponding_Voxel_Location) can be replaced by Weight(Corresponding_Voxel_Distance).

In an embodiment of the system 100, the pixel weight is computed based on a user input. The user interface 165 may comprise means, e.g. a control panel, for obtaining a user input for computing pixel weights. Optionally, the control panel may comprise means for defining a CVP threshold. Alternatively, the pixel weight and/or the CVP threshold may be predetermined, or may be derived from e.g. a protocol for using the system 100. Such a protocol may be based on the volumetric image data acquisition modality used for acquiring the volumetric image data set. Information on the volumetric image data acquisition modality may be comprised in meta-data associated with the volumetric image data, for example.

Figure 3:
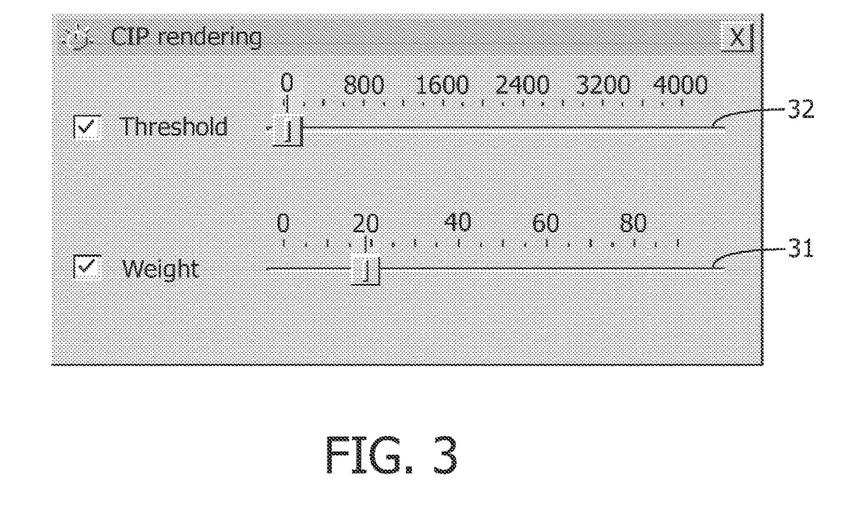
FIG. 3 shows an exemplary control panel for determining pixel weight factors based on a linear weight function.

FIG. 3 shows an exemplary control panel for determining pixel weight factors based on a linear weight function. The weight Weight(Corresponding_Voxel_Distance) is a linear function of the Corresponding_Voxel_Distance. For Corresponding_Voxel_Distance=0, i.e. for a voxel substantially comprised in the viewing plane, the pixel weight is 100%. The position of the weight slider 31 defines the weight of the most distant voxel. In FIG. 3, the pixel weight of the most distant voxel is 20%. Optionally, the control panel may comprise a threshold slider 32 for defining a CVP threshold.

Figure 4:
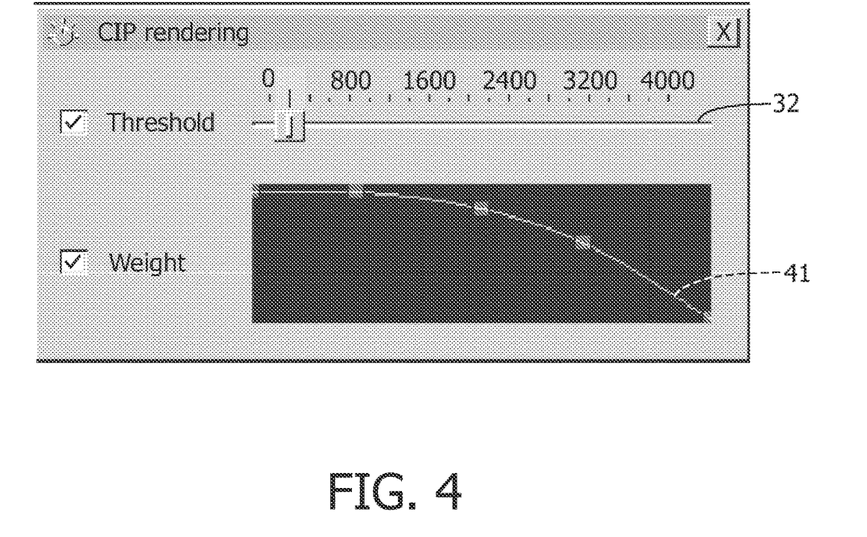
FIG. 4 shows an exemplary control panel for determining pixel weight factors based on a nonlinear weight function.

FIG. 4 shows an exemplary control panel for determining pixel weight factors based on a nonlinear weight function Weight(Corresponding_Voxel_Distance). The weight Weight(Corresponding_Voxel_Distance) is a nonlinear function of the Corresponding_Voxel_Distance. The pixel weight function is graphically represented by a curve 41 representing a graph of the weight function. The vertical coordinate of a point on the curve defines the weight, e.g. a number from the range [0, 1]. The horizontal coordinate of a point on the curve defines the distance from the corresponding voxel to the viewing plane. The curve is controlled by a set of control points. The control points may be defined and controlled by the user, e.g. using a mouse input device. The curve can be implemented using B-splines, for example. Optionally, the control panel may comprise a threshold slider 32 for defining a CVP threshold.

Typically, the system 100 may be used to enhance visibility of voxels relatively close to the viewing plane and to weaken the visibility of voxels relatively distant from the viewing plane. However, the system 100 may be used to enhance visibility of voxels in any range of distances from the viewing plane and to weaken visibility of voxels outside this range.

The skilled person will understand that other embodiments of the system 100 are also possible. It is possible, among other things, to redefine the units of the system and to redistribute their functions. For example, in an embodiment of the system 100, the weight unit 115 may be a component of the adjustment unit 120. In a further embodiment of the system 100, there can be a plurality of computation units replacing the computation unit 110. Each computation unit of the plurality of computation units may be arranged to employ a different rendering method. The employed method may be based on a user selection.

The units of the system 100 may be implemented using a processor. Normally, their functions are performed under control of a software program product. During execution, the software program product is normally loaded into a memory, like a RAM, and executed from there. The program may be loaded from a background memory, like a ROM, hard disk, or magnetic and/or optical storage, or may be loaded via a network like the Internet. Optionally an application-specific integrated circuit may provide the described functionality.

Figure 5:
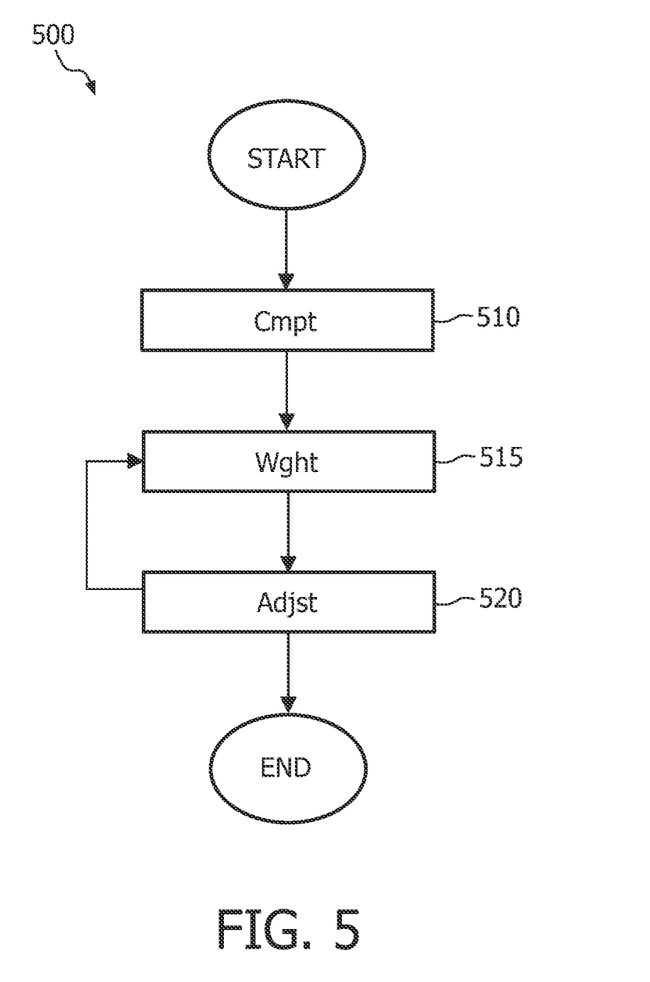
FIG. 5 shows a flowchart of an exemplary implementation of the method.

FIG. 5 shows a flowchart of an exemplary implementation of the method 500 of rendering an image based on a volumetric image data set. The method 500 begins with a computation step 510 for computing an initial pixel intensity of a pixel of the image defined by a corresponding voxel intensity of a corresponding voxel comprised in the volumetric image data set. After the computation step 510, the method 500 continues to weight step 515 for computing a pixel weight of the pixel, based on a location of the corresponding voxel in the image data volume. After the weight step 515 the method continues to an adjustment step 520 for computing a final pixel intensity of the pixel based on the initial pixel intensity and on a weight computed based on the location of the corresponding voxel. After the adjustment step 520 the method 500 may terminate. Optionally, the method may continue to the weight step 515 if further adjusting of the final pixel intensities using new pixel weights is requested by the user.

The order of steps in the method 500 is not mandatory, the skilled person may change the order of some steps or perform some steps concurrently using threading models, multi-processor systems or multiple processes without departing from the concept as intended by the present invention. Optionally, two or more steps of the method 500 of the current invention may be combined into one step. Optionally, a step of the method 500 of the current invention may be split into a plurality of steps.

Figure 6:
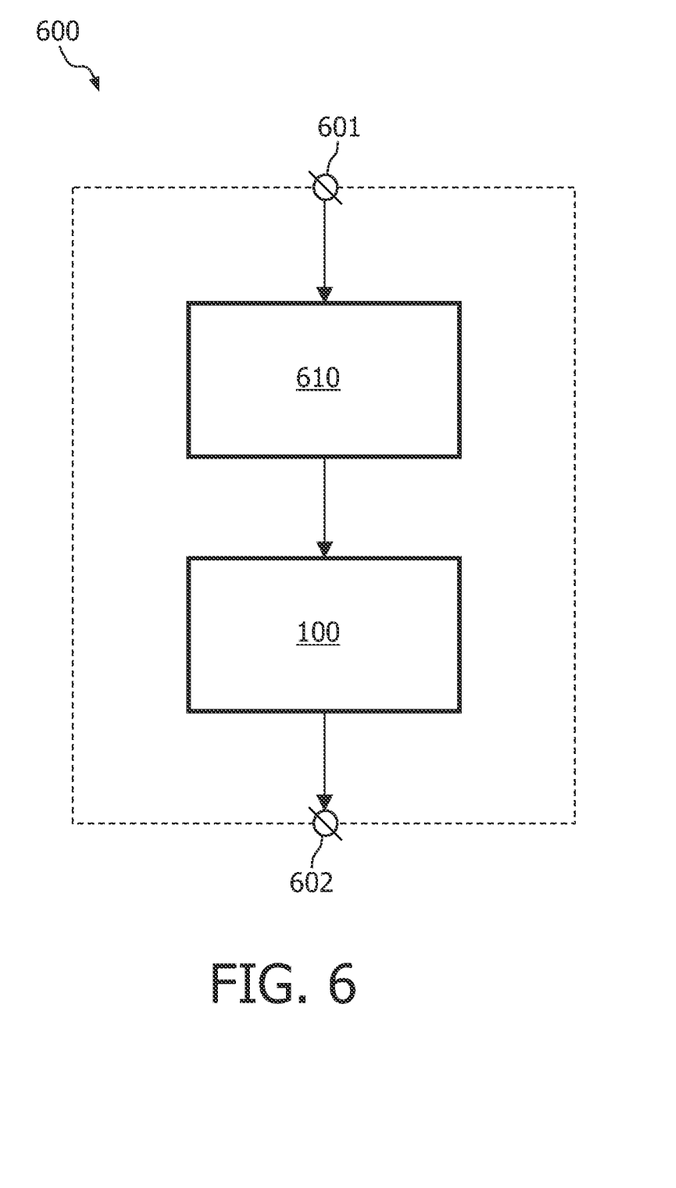
FIG. 6 schematically shows an exemplary embodiment of the image acquisition apparatus.

FIG. 6 schematically shows an exemplary embodiment of the image acquisition apparatus 600 employing the system 100, said image acquisition apparatus 600 comprising an image acquisition unit 610 connected via an internal connection with the system 100, an input connector 601, and an output connector 602. This arrangement advantageously increases the capabilities of the image acquisition apparatus 600, providing said image acquisition apparatus 600 with advantageous capabilities of the system 100 for rendering an image based on a volumetric image data set. Examples of image acquisition apparatus comprise, but are not limited to, a CT system, an X-ray system, an MRI system, a US system, a PET system, a SPECT system, and a NM system.

Figure 7:
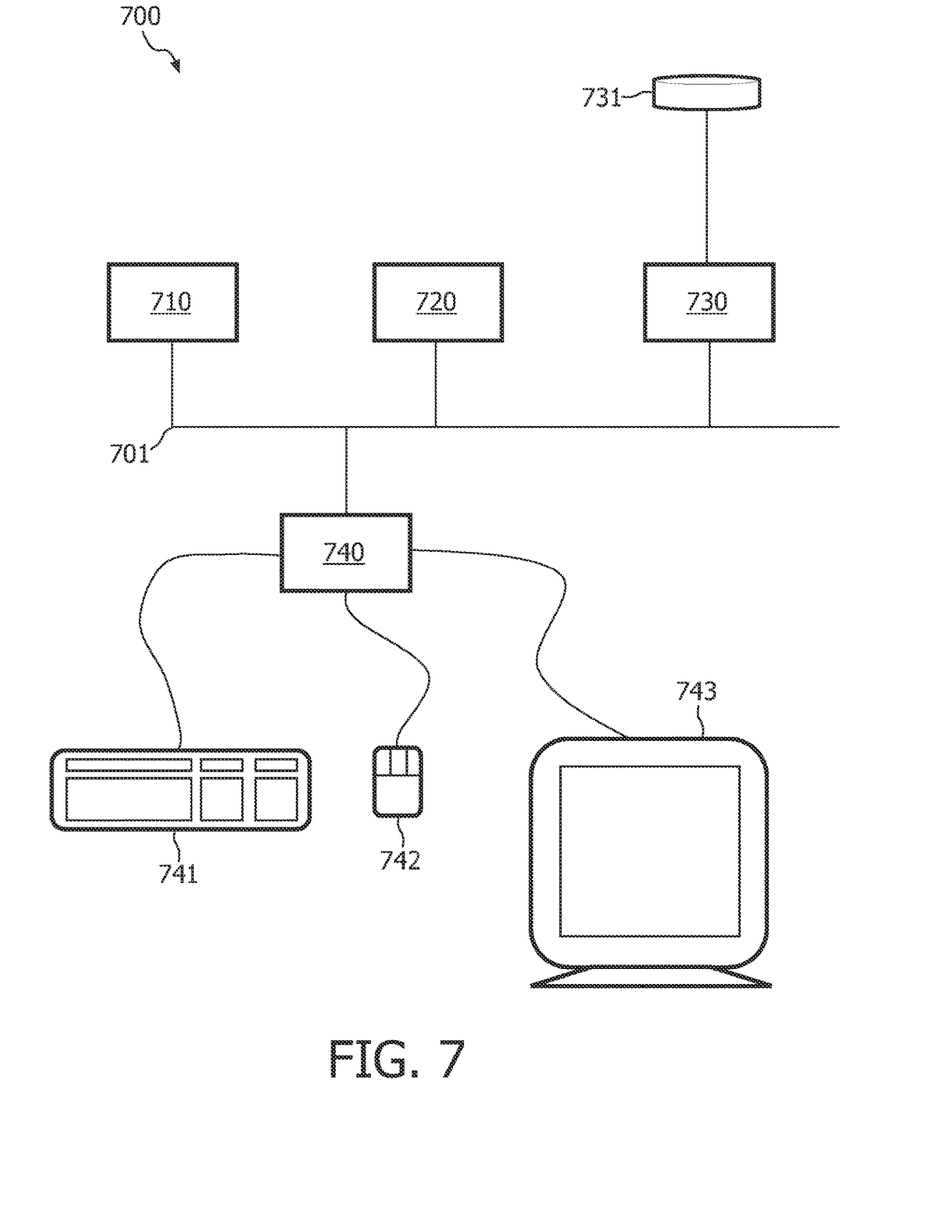
FIG. 7 schematically shows an exemplary embodiment of the workstation.

FIG. 7 schematically shows an exemplary embodiment of the workstation 700. The workstation comprises a system bus 701. A processor 710, a memory 720, a disk input/output (I/O) adapter 730, and a user interface (UI) 740 are operatively connected to the system bus 701. A disk storage device 731 is operatively coupled to the disk I/O adapter 730. A keyboard 741, a mouse 742, and a display 743 are operatively coupled to the UI 740. The system 100 of the invention, implemented as a computer program, is stored in the disk storage device 731. The workstation 700 is arranged to load the program and input data into memory 720 and execute the program on the processor 710. The user can input information to the workstation 700, using the keyboard 741 and/or the mouse 742. The workstation is arranged to output information to the display device 743 and/or to the disk 731. The skilled person will understand that there are numerous other embodiments of the workstation 700 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second and third, et cetera does not indicate any ordering. These words are to be interpreted as names.

The invention claimed is:

1. A system for rendering an image based on a volumetric image data set, the system comprising:
a computation unit for computing initial pixel intensities of pixels of the rendered image, wherein the rendered image comprises one selected from a group comprising of a closest vessel projection (CVP), a maximum intensity projection (MIP) image, and a minimum intensity projection (MinIP) image, wherein each pixel intensity of the rendered image corresponds to one voxel intensity of the volumetric image data set; and
an adjustment unit for computing a final pixel intensity of each pixel of the rendered image as a product of each initial pixel intensity and a pixel weight, wherein the pixel weight is computed as a function of a distance measured between a position of the corresponding one voxel intensity of the volumetric image data set and the view plane with user input from a control panel changing the function;
wherein the function includes a linear function of the distance measured between a position of the corresponding one voxel intensity of the volumetric image data set and the view plane with a maximum weight for a first voxel within the view plane and a minimum weight for a second voxel that is a most distant voxel from the view plane and the minimum weight determined by the user input from the control panel;
wherein the user input from the control panel comprises a weight slider that defines a pixel weight percentage of the most distant voxel from the view plane.

2. The system of claim 1, wherein the distance is a Euclidian distance.

3. An image acquisition apparatus comprising the system of claim 1.

4. A workstation comprising the system of claim 1.

5. A system for rendering an image based on a volumetric image data set, the system comprising:
a computation unit for computing initial pixel intensities of pixels of the rendered image, wherein the rendered image comprises one selected from a group comprising of a closest vessel projection (CVP), a maximum intensity projection (MIP) image, and a minimum intensity projection (MinIP) image, wherein each pixel intensity of the rendered image corresponds to one voxel intensity of the volumetric image data set; and
an adjustment unit for computing a final pixel intensity of each pixel of the rendered image as a product of each initial pixel intensity and a pixel weight, wherein the pixel weight is computed as a function of a distance measured between a position of the corresponding one voxel intensity of the volumetric image data set and the view plane with user input from a control panel changing the function;
wherein the function includes a non-linear function of the distance measured between the position of the corresponding one voxel intensity of the volumetric image data set and the view plane modified by a plurality of control points, wherein the final pixel intensity of each pixel is further determined by:
displaying graphically in the control panel the plurality of control points and a non-linear curve fitted to the plurality of control points with pixel weights on a vertical axis and with distances on a horizontal axis, and each of the plurality of the control points represents a different distance with a corresponding pixel weight, and the non-linear curve represents the non-linear function;
receiving the user input from the control panel which changes the corresponding pixel weight of at least one of the plurality of control points to form a second plurality of control points that represent the user input and define and control pixel weights;
fitting a curve to the second plurality of control points;
computing the pixel weights according to the fitted curve; and
adjusting the final pixel intensity of each pixel of the rendered image as a product of each initial pixel intensity and the pixel weight according to the fitted curve.

6. The system according to claim 5, wherein the curve fitted to the second plurality of control points comprises a B-spline.

7. The system according to claim 5, wherein the curve fitted to the second plurality of control points comprises a Bezier curve.

8. A non-transitory memory of a computer arrangement loaded with a computer program product comprising instructions for rendering an image based on a volumetric image data set, the computer arrangement comprising a processing unit and the memory, wherein the computer program product when executed by said processing unit causes the processing unit to:

compute initial pixel intensities of pixels of the rendered image, wherein the rendered image comprises one selected from a group comprising of a closest vessel projection (CVP), a maximum intensity projection (MIP) image, and a minimum intensity projection (MinIP) image, wherein each pixel intensity of the rendered image corresponds to one voxel intensity of the volumetric image data set; and compute a final pixel intensity of each pixel of the rendered image as a product of each initial pixel intensity and a pixel weight, wherein the pixel weight is computed as a function of a distance measured between a position of the corresponding one voxel intensity of the volumetric image data set and the view plane with user input from a control panel changing the function;

wherein the function includes a non-linear function of the distance measured between the position of the corresponding one voxel intensity of the volumetric image data set and the view plane modified by a plurality of control points, wherein the final pixel intensity of each pixel is further determined by:

displaying graphically in the control panel the plurality of control points and a non-linear curve fitted to the plurality of control points with pixel weights on a vertical axis and with distances on a horizontal axis, and each of the plurality of the control points represents a different distance with a corresponding pixel weight, and the non-linear curve represents the non-linear function;

receiving the user input from the control panel which changes the corresponding pixel weight of at least one of the plurality of control points to form a second plurality of control points that represent the user input and define and control pixel weights;

fitting a curve to the second plurality of control points;

computing the pixel weights according to the fitted curve; and adjusting the final pixel intensity of each pixel of the rendered image as a product of each initial pixel intensity and the pixel weight according to the fitted curve.

* * * * *